3,296,219
ACID TREATMENT OF POLYESTER RESINS CONTAINING ALKYLENE OXIDE

Charles W. Jacoby, Morristown, Forrest W. Tubbs, Wharton, and Thomas C. Wilson, Morris Plains, N.J., and Orrin D. Storm, Toledo, Ohio, assignors to Allied Chemical Corporation, New York, N.Y., a corporation of New York
No Drawing. Filed Sept. 18, 1963, Ser. No. 309,890
8 Claims. (Cl. 260—78.4)

The present invention relates to a new process for producing linear polyesters which contain ethylenically unsaturated dicarboxylic acid anhydride residues in the polymer chain and which are suitable for cross-linking with an ethylenically unsaturated monomeric compound. More particularly, the invention relates to a new process for the production of polyesters wherein alkylene oxides are reacted with ethylenically unsaturated dicarboxylic acid anhydrides.

Alkylene oxides have already been recognized as potentially useful materials for preparing polyesters; however, early attempts to prepare polyesters from alkylene oxides resulted in products which possessed poor physical properties compared to polyesters prepared from dihydric alcohols. Recently, it was discovered that alkylene oxides may be reacted with dicarboxylic acid anhydrides in a temperature range of from 30° C. to 150° C. using a strong base such as sodium hydroxide as a catalyst and a small amount of water as an initiator. Polyesters prepared from alkylene oxides in this manner exhibit many improvements over those heretofore known however their physical properties are still inferior to polyesters produced from glycols and they tend to have poor color, thus they are of little commercial value.

It is now known that the inferior physical properties of resins produced from alkylene oxides by the aforementioned process may be improved to a level comparable with esters prepared from dihydric alcohols by subjecting these resins to a heat treatment consisting of heating the resin at an elevated temperature in the range of about 200° C. to about 240° C., preferably about 210° C. to about 220° C., for from several minutes to several hours. However, this heat treatment further degrades the color of these resins until they are extremely dark, thus making them unacceptable for many commercial applications.

Accordingly, it is a primary object of the present invention to provide a process for preparing polyester resins from alkylene oxides which are improved in color and possess satisfactory physical properties.

It is a further object of the present invention to provide such a process which utilizes common inexpensive materials and which can be carried out in a simple, economical manner. These and other objects and advantages will become apparent from the detailed description of the invention set forth herein below.

It has now been discovered that the color of the polyester resins prepared by reacting alkylene oxides with dicarboxylic acids or anhydrides using an alkaline material such as sodium hydroxide as a catalyst is greatly improved by treating the resinous product with phosphoric acid prior to subjecting the same to a heat treatment. Henceforth, the dicarboxylic compounds shall be referred to as anhydrides with the understanding that corresponding acids may also be utilized. While any acid may be used which is strong enough to neutralize the alkaline catalyst, it is preferable to use acids which are not strong oxidizing agents since such acids have a tendency to gel the resin. Phosphoric acid was found to be particularly useful since, in addition to neutralizing the alkaline polymerization catalyst, it appears to catalyze the isomerization of maleic to fumaric structure during heat treatment of the resin. Furthermore, no corrosion problem is involved in the use of phosphoric acid. Other acids which appear to be useful include, for example, hydrochloric, trichloroacetic and toluene sulfonic.

The process for producing polyester resins in accordance with the present invention comprises mixing together the dicarboxylic anhydrides, catalyst and an initiator such at water, and heating the mixture to a temperature sufficient to melt the anhydrides, which will ordinarily be in the range of from 75° C. to 190° C. While numerous alkaline catalysts are useful in promoting the polymerization reaction of the present invention, it is preferable to use an alkali metal hydroxide. Where improved color is the objective, particularly good results are obtained when lithium hydroxide is used as the catalyst. Suitable initiators, other than water, include difunctional glycols such as ethylene glycol, propylene glycol and the like and difunctional carboxylic acids such as fumaric, maleic and the like. Of course, when a dicarboxylic acid such as fumaric is used in formulating the polyester, it will initiate the esterification reaction thus obviating the need for any other initiator.

While all of the catalyst is normally added to the anhydride melt at the beginning of the reaction between the alkylene oxide and the dicarboxylic anhydrides, it is often desirable to add the catalysts in increments at periodic intervals during the addition of the alkylene oxide. In some instances it may be preferred to add the catalyst continuously as the alkylene oxide is added. The incremental or continuous addition of the catalyst tends to drive the desired reaction to completion more rapidly thereby providing shorter reaction times and facilitating maintenance of the reaction product within the desired resin specifications. Furthermore, when the catalyst is added in this manner, it is possible to introduce various catalysts into the reaction system whereby selected catalyst may be used to promote specific chain formations, thus developing desired resin properties.

After the anhydride melt has been formed, the alkylene oxide, preferably a stoichiometric amount, is added continuously over a period of time; usually from 1 to 12 hours. While it is preferred to add the alkylene oxide continuously, it is to be understood that the alkylene oxide may be added in increments or that the entire amount to be reacted may be mixed with the dicarboxylic anhydrides and catalyst at the start of the reaction. Similarly, while all of the dicarboxylic anhydrides are usually mixed together at the start of the reaction, it may be desirable to react the alkylene oxide with different dicarboxylic anhydrides at various stages thus placing different specific molecular configurations along the spine of the polymer chain. For example, an alkylene oxide may be initially reacted with phthalic anhydride, the reaction mass cooled, maleic anhydride charged to the mass and the alkylene oxide again added to the mass to react with the maleic anhydride.

During the addition of the alkylene oxide, the temperature of the melt is either maintained within the range of about 125° C. to 135° C. or it is allowed to rise slowly from a temperature of about 90° C. to a temperature of about 200° C. To avoid the use of costly and complex equipment, the reaction is normally carried out at about atmospheric pressure. However, it is to be understood that the reaction may be carried out under pressure with beneficial results such as shortened reaction time and reduced loss of alkylene oxide at faster rates of addition thereof. Satisfactory results have been obtained under pressures up to 100 p.s.i.g. and higher. When the alkylene oxide has been added and the esterification reaction completed, the resinous product should have an acid number of from about 20 to 130. Preferably the acid number should be within the range of about 40 to 80.

After the alkylene oxide has been reacted with the anhydride melt, a sufficient amount of phosphoric acid is added to the reaction mass to neutralize the polymerization catalyst. The amount of acid required will vary depending upon the particular acid used and the type of resin formulated. In general, the amount of acid used will be within the range of 0.1 to 2 percent by weight of the total charge, however, more or less may be used as long as there is sufficient acid present to neutralize the alkaline polymerization catalyst.

When the polymerization catalyst has been neutralized, the resinous product is usually subjected to a heat treatment to obtain a resin having satisfactory physical properties. It is believed that heat treatment of the resinous product isomerizes maleic to fumaric structure with a resulting improvement in physical properties of the final product. A satisfactory heat treatment is usually obtained by heating the resinous product at a temperature of from about 200° C. to 240° C. for from about 30 minutes to 6 hours. The time required for the heat treatment will vary depending on the temperature employed and the nature of the resin. Since prolonged heating at high temperatures tends to degrade the color of a resin, the lowest temperature and shortest heating time which gives satisfactory resin properties, as indicated by shorter gel time and higher peak exotherm temperature, should be employed.

After heat treatment it may be necessary to add an additional amount of alkylene oxide sufficient to bring the acid number of the final product within the desired commercial range. The final polyester resin product will normally have a viscosity of from about G to K on the Gardner scale (at 25° C.; 60% solids in methyl Cellosolve) and an acid number of from about 10 to 70 and preferably about 10 to 40. The polyester product is usually thinned with from 20–50 percent by weight of the total composition of a polymerizable monomer having at least one $CH_2=C<$ group, such as, for example styrene or vinyl toluene.

Alkylene oxides suitable for use in the present invention include, ethylene oxide, propylene oxide and butylene oxides. While propylene oxide is preferred, the other alkylenes oxides may be used in whole or in part. During reaction between the dicarboxylic anhydrides and the alkylene oxide, the later, if present in amount substantially greater than the stoichiometric equivalent of the anhydride used, tends to condense with itself to some extent to form diglycol and polyglycol units in the polyester chain. Hence, in certain instances it may be desirable to have the ratio of alkylene oxide to anhydrides up to as high as four to one to obtain flexibility in the resin. Since there appears to be no tendency on the part of the anhydrides to condense with themselves, and thereby repeat themselves in the chain, no advantage appears obtainable by reducing the ratio of alkylene oxide to anhydrides below 0.9 to 1.0.

Occasionally alkylene oxides, even though "water-white" in appearance, will contain impurities which seriously degrade the color of the final product. Carbon treatment of these impure alkylene oxides prior to use substantially eliminates any discoloration of the final product due to such impurities. This carbon treatment consists of agitating the alkylene oxide with about five weight percent powdered activated carbon for about one-half an hour at room temperature and then filtering out the carbon.

In carrying out the process of the present invention, it is preferable to use maleic anhydride and phthalic anhydride in approximately equal molar ratios. Since the polyester must contain sufficient unsaturation to allow cross-linking with a suitable polymerizable monomer containing at least one $CH_2=C<$ group such as, for example, styrene, the total anhydrides present should comprise at least ten mol percent of an alpha-beta unsaturated dicarboxylic anhydride. For most commercial applications, it has been found preferable to have the mol proportion of alpha-beta unsaturated dicarboxylic anhydride no lower than 20 mol percent.

In addition to maleic anhydride, excellent polyesters have been prepared from fumaric acid in combination with phthalic anhydride. Suitable anhydrides other than phthalic which may be used in various proportions with an alpha-beta unsaturated dicarboxylic anhydride include for example, succinic anhydride, adipic anhydride, glutaric anhydride, octenyl succinic anhydride, diglycollic anhydride, thiodiglycollic anhydride, tetrahydrophthalic anhydride, tetrachlorophthalic anhydride and similar mono-, di- or tri-substituted phthalic anhydride, Diels-Alder adducts of cyclopentadiene (or substituted derivatives thereof), and the like.

The following example is intended to illustrate more fully the preparation of polyesters in accordance with the practice of this invention. This example is set forth primarily for purposes of illustration and any specific enumeration in detail contained therein should not be interpreted as a limitation, except as indicated in the appended claims.

*Example*

The following materials were charged to a reaction kettle and reacted in the manner to be described:

| | Mol percent (based on total anhydrides) |
|---|---|
| Phthalic anhydride | 50 |
| Maleic anhydride | 46.9 |
| Fumaric acid | 3.1 |
| Lithium hydroxide | 0.483 |
| Water (initiator) | 15.5 |
| Propylene oxide | 112 |

The reaction mass was heated to 130° C. to 135° C. and maintained at this temperature while the propylene oxide was added drop-wise over a period of 3 hours. After an additional fifteen minutes, a stream of carbon dioxide was introduced under the liquid surface. At this point, the acid number of the resin mass was 51. The resin mass was then heated to about 180° C. and approximately 0.5 percent by weight of the total charge of an 85 percent phosphoric acid solution was added to neutralize the catalyst. The temperature of the reaction mass was maintained at 205° C. for approximately 2 hours. After this heat treatment, additional propylene oxide (about 5 mol percent) was added to lower the acid number of 36. At this point the reaction mass was cooled to 100° C. and thinned with 30 percent by weight of styrene monomer (based on thinned resin).

Analysis of the final resinous product was as follows:

| | |
|---|---|
| Acid No. | 36. |
| Color | <1 hellige. |
| Viscosity (25° C.) | X. |
| Gel time | 3.1 minutes. |
| Peak exotherm | 394° F. |

As demonstrated by the foregoing example, acid neutralization of the alkaline polymerization catalyst prior to heat treatment produces a resin having a color on the order of 1 hellige. This represents a highly significant improvement in the color of the resins herein concerned since prior processes using an alkali catalyst without acid neutralization thereof, seldom obtain a color better than 9 or 10 hellige. The resins produced by the process of the present invention are extremely useful in low color applications such as architectural sheets or panels.

Various other modifications and treatments which may be carried out during formation of the final product are within the purview of this invention. For example, the reactivity of the final product may be substantially improved by adding a small amount of an alkali metal halide to the reaction mass after the initial reaction of alkylene oxide and dicarboxylic acids and then heating the mass at approximately 120° C. for an extended period of time. Included among the alkali metal halides found most useful for this treatment are sodium bromide, potassium chloride, potassium bromide, potassium iodide and others.

We claim:
1. In the process which comprises reacting a dicarboxylic acid or anhydride component containing at least 10 mol percent maleic acid or anhydride with ethylene oxide, propylene oxide, butylene oxides or mixtures thereof in the presence of an alkali metal hydroxide or alkaline earth metal hydroxide catalyst to obtain a polyester product and thereafter heat treating said polyester product, the improvement which comprises adding a sufficient amount of phosphoric acid to neutralize said catalyst prior to said heat treatment.
2. A process as defined in claim 1 wherein said component is a mixture of phthalic anhydride and maleic anhydride.
3. A process as defined in claim 1 wherein said polyester product is prepared from propylene oxide.
4. A process as defined in claim 1 wherein said heat treatment comprises heating said polyester product at a temperature of from about 200° C. to 240° C. for a period of from about 30 minutes to 6 hours.
5. A process as defined in claim 1 wherein said catalyst is an alkali metal hydroxide.
6. A process as defined in claim 1 wherein said catalyst is lithium hydroxide.
7. A process as defined in claim 1 wherein the amount of phosphoric acid added is about 0.1 to 2% by weight of the total charge.
8. A process as defined in claim 1 wherein additional alkali oxide is added after said heat treatment in an amount sufficient to reduce the acid number of said polyester product to within the range of 10 to 40 and said polyester product is mixed with from 20 to 50% by weight of the total composition of a polymerizable monomer having at least one $CH_2=C<$ group.

References Cited by the Examiner
UNITED STATES PATENTS

| | | | |
|---|---|---|---|
| 2,779,783 | 1/1957 | Hayes | 260—78.4 |
| 2,822,350 | 2/1958 | Hayes | 260—78.4 |
| 3,213,067 | 10/1965 | Pohl | 260—78.5 |

FOREIGN PATENTS 623,783  3/1963  Belgium.

JOSEPH L. SCHOFER, *Primary Examiner.*

L. WOLF, L. G. CHILDERS, *Assistant Examiners.*